July 2, 1940.   D. H. STEWART   2,206,132
FOCUSING ATTACHMENT FOR SHUTTERS
Filed Jan. 14, 1939
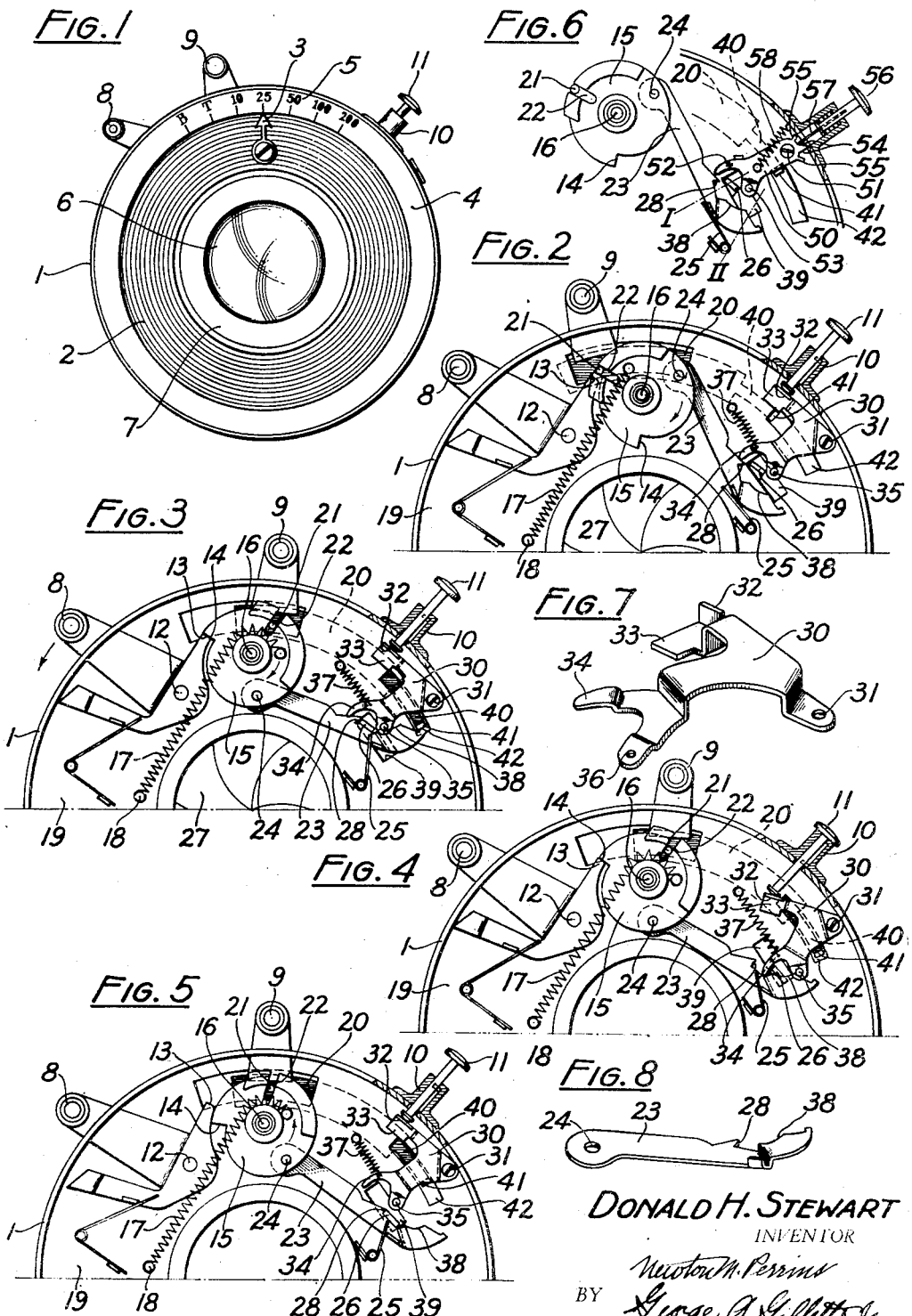
DONALD H. STEWART
INVENTOR Patented July 2, 1940

2,206,132

UNITED STATES PATENT OFFICE 2,206,132

FOCUSING ATTACHMENT FOR SHUTTERS

Donald H. Stewart, Rochester, N. Y., assignor to Eastman Kodak Company, Rochester, N. Y., a corporation of New Jersey Application January 14, 1939, Serial No. 250,947

8 Claims. (Cl. 95—62)

This invention relates to photography and more particularly to a means for readily opening a photographic shutter for focusing on a ground glass.

One object of my invention is to provide a lever on a photographic shutter of known type which will open the leaves for focusing without disturbing the setting of the shutter. Another object of my invention is to provide a means for opening the leaves of a shutter which is locked except when the tensioning lever of the shutter has been set. Still another object of my invention is to provide a shutter with an operating member by which the usual leaf operating latch may be unlatched and by which the blades may be manually opened and closed independently of the usual shutter operating mechanism. Other objects will appear from the following specification, the novel features being particularly pointed out in the claims at the end thereof.

In cameras utilizing film packs and plates, it is customary to provide a ground glass on which the image may be focused, such cameras being largely used by professional photographers and particularly by press photographers. While a between-the-lens shutter has many advantages, one of the disadvantages of the shutters now on the market is that where an image is to be focused on the ground glass, it is necessary to set the shutter to "time" or "bulb," press the trigger to open the leaves, focus on the ground glass, press the trigger to close the leaves, reset the shutter to the desired speed graduation, and reset the tensioning lever of the shutter before an exposure can be made.

In order to greatly speed up this entire operation, I have proposed a shutter in which there is a manually operable lever which can only be moved when the shutter has been tensioned and can then be moved to manually open the blades for focusing, after which the blades may be closed by a spring or by manual operation. Thus, with my improved shutter, the shutter can be set at any desired speed setting, and it is unnecessary to alter this setting for focusing on the ground glass and, moreover, it is unnecessary to reset the shutter after opening and closing the blades in order to make an exposure.

Coming now to the drawing wherein like reference characters denote like parts throughout:

Fig. 1 is a front plan view of a shutter constructed in accordance with and embodying the preferred form of my invention.

Fig. 2 is an enlarged fragmentary plan view of the shutter shown in Fig. 1 with the shutter cover plate and parts of the shutter removed.

Fig. 3 is a view similar to Fig. 2 but with the parts in a set position in which the shutter is normally ready to make an exposure.

Fig. 4 is a view similar to Fig. 3, but with the blade opening mechanism shown in position to open the leaves of the shutter.

Fig. 5 is a view similar to the preceding view, but with the shutter operating mechanism shown in position to hold the leaves wide open.

Fig. 6 is a fragmentary detail view of a modified form of my invention.

Fig. 7 is a perspective view of the shutter opening bell-crank lever, and

Fig. 8 is a perspective view of the shutter operating latch member.

For the purposes of illustrating my invention, I have shown a shutter of the type shown in U. S. Patent 2,099,866, Riddell, granted November 23, 1937. This shutter may consist of a shutter casing 1, having a shutter cover plate 2 provided with a speed pointer 3 and an annular member 4 carrying the speed graduations 5 rotatably mounted on the outside edge of the cover. A front lens element 6 may be mounted in a lens cell 7 and the shutter may be equipped with the usual trigger 8 and setting lever 9. In addition to these parts, I prefer to provide a bearing member 10 on an edge wall of the shutter carrying in this case a push-button 11 which may be used to manually open and close the shutter leaves, as will be more fully hereinafter described.

Referring to Fig. 2, the shutter casing 1 carries the trigger 8 on a stud 12, this trigger being provided with an arm 13 cooperating with a lug 14 on the master member 15, which is pivoted upon a stud 16.

The master member includes a spring 17 anchored at 18 to the annular plate 19 which is placed under tension when the setting lever 9 is moved from the position shown in Figs. 1 and 2 to the position shown in Fig. 3. The lever 9 is carried by an arcuate plate 20 which slides in a suitable arcuate slideway and which carries a pin 21 which engages the slot 22 in the master member for turning it about its stud 16 during the setting operation to tension the spring. In addition, the movement of the master member 15 moves a latch member 23, best shown in Fig. 8, this latch member being pivoted at 24 to the master member and being held by a light spring 25 toward a blade ring lug 26 mounted on an annular ring which is oscillated back and forth to open and close the shutter leaves 27 in a known manner. As thus far described, the shutter is the same as shown in the above-mentioned Riddell patent. It will be noted that when the lever 23 is in its unset position shown in Fig. 2, the hook member 28 lies clear of the blade ring lug 26 and consequently, when the setting lever 9 is moved to the right with reference to this figure, the latching arm 23 has an idle stroke, but at the end of this stroke, as indicated in Fig. 3, the hook engages the blade ring lug 26.

Since it is desirable to open and close the blades when the shutter is set, it is desirable to move the latch member 23 away from the blade ring lug 26 and to move the blade ring lug 26 manually to open and close the leaves for focusing.

This is done by means of a bell-crank lever 30, best shown in Fig. 7. This bell-crank lever is pivoted at 31 to the annular plate 19 and includes an operating lug 32, a holding arm 33, a blade ring lug operating arm 34 and a latch operating pin 35 which passes through an aperture 36 in a portion of the bell-crank lever.

The push-button 11, of all figures except 6, is adapted to engage the operating lug 32 so that when the push-button 11 is depressed, the bell-crank lever is rocked against the action of the spring 37 so that the pin 35 engages the cam end 38 of the operating latch 23 and rocks this latch member against the action of spring 25, moving it to the position shown in Fig. 4. As the pin 35 presses against the cam edge 38 and the latch moves as above described, the lug operating arm 34 engages the blade ring lug 26 and swings it through its slot 39 to open the blades, as indicated in Fig. 4. Focusing can now be accomplished, the operator holding his finger on the push-button 11 to hold the blades open. As soon as the focusing has been completed, the push-button 11 is released and the spring 37 returns the bell-crank lever 30 to its initial position. During this movement, the pin 35 moves away from the cam edge 38 so that the latch 23 is again moved by its spring 25 into engagement with the blade ring operating lug 26. Thus, the shutter blades may be opened and closed manually, and this can be done regardless of the condition of the shutter setting or the position of the shutter setting lever 9.

However, I have found that the operation of such a shutter is speeded up if the shutter is set for the desired speed of exposure with the desired diaphragm opening and with the setting lever in its shutter tensioning position prior to focusing. In order to prevent the operation of the bell-crank lever 30, except when the shutter is set, I have provided an extension 40 on the end of the arcuate plate 20 carrying the setting lever and have made a formed-up lug 41 on the end of this member which extends up through a slot 42 in the annular plate 19. This lug normally lies along the edge of the arm 33 of lever 30 so that if an attempt is made to depress the push-button 11, it cannot be moved until the lug 41 is moved away from this position, as the shutter setting lever 9 is moved to its set position shown in Fig. 3. In this position, the bell-crank lever 30 is free to move. Consequently, with the preferred form of my invention utilizing the arm 33 and the lug 41, the leaves may only be opened and closed when the shutter is set. This feature, of course, may be readily omitted by omitting the formed-up lug 41.

As described above, the lever 11 must be held in a depressed position while focusing. However, if desired, it can be arranged so that one depression of the lever opens the blades and a second depression closes them. Such a structure is shown in Fig. 6 wherein the parts are all like the parts previously described, with the exception that in place of the bell-crank lever 30, I provide a lever 50 pivoted at 51 and provided with a blade ring lug operating arm 52, a latch operating pin 53 quite similar to the arm 34 and the pin 35 of the bell-crank lever 30. These parts operate in the same way, but the lever 50 is operated in a different manner. This lever is provided with a pair of oppositely disposed cam surfaces 54 and a pair of spaced lugs 55 so positioned that one depression on the lever 56 causes the piano wire spring 57 to thrust the lever 50 about its pivot 51 so that the spring 58 passes the dead center and will hold the arm as indicated by the line II, its normal position being shown by the line I. A second depression of the push-button 56 causes the piano wire spring 57 to engage the opposite cam face 54 so that the lever 50 returns to the position shown in Fig. 6 as the spring 58 moves past the dead center of the pivotal point 51. Thus, with this form of my invention, the push-button is depressed once to open the shutter and a second time to close the shutter, which movement is considered by some to be an advantage. I might point out, however, that with this construction there may be some tendency to accidentally leave the shutter open after focusing, whereas with the first-described embodiment of my invention, this cannot occur.

As in the bell-crank form of my invention, it is possible to provide this type of opening lever with a means for preventing its operation unless the shutter is set, if this should be deemed advisable. The arcuate plate 20 of the setting lever 9 is provided with an upstanding lug 41 as before, and, as indicated in Fig. 6, this lug may engage a wall of the lever 50 to prevent its operation until moved through the slot 42 during the setting operation.

With any of the embodiments of my invention shown in the drawings, it is obvious that a shutter may be set for the desired speed as, for instance, a twenty-fifth of a second, as shown in Fig. 1, and the setting lever 9 may be then moved to the right with regard to this figure to set the shutter. The operator then merely depresses a push-button 11 to open the shutter blades and may focus on the ground glass, and when this button is released, the shutter blades automatically close under the impulse of the usual light spring holding the blade ring lug 26 in the position shown in Figs. 2 and 3. The operation of depressing the button automatically disengages the lug ring lever latch and automatically thrusts the blade ring lug into a position to open the blades and permits them to close as the button returns to its initial position. Thus, the focusing movement may be rapidly accomplished, and immediately after inserting the film or plate, the trigger 8 may be depressed to make an exposure.

If the shutter is equipped for the purpose, the push-button 11 may only be depressed when the master member is set. If the shutter is of the construction shown in Fig. 6, the push-button must be depressed once to open the shutter blades and a second time to close the shutter blades. In either case, the operation of this shutter is simple and adds but little to the normal cost of the shutter.

What I claim is:

1. In a photographic shutter, the combination with a shutter casing having an exposure opening therein, of a master member including a power spring mounted therein, a setting lever for tensioning the power spring, a trigger for releasing the power spring, shutter leaves for opening and closing the exposure opening, mechanism for connecting the master member to the shutter leaves for operating the latter from the former, and movably mounted supplementary means carried by the shutter for engaging and disconnecting the mechanism for connecting the master member to the shutter leaves, said supplementary means including a member adapted to engage and move a part of the mechanism connected to the shutter leaves for operating said shutter leaves independently of the master member, and a blocking member carried by the setting lever adapted to hold the supplementary means immovable except when the shutter spring is set.

2. In a photographic shutter, the combination with a shutter casing, of shutter leaves carried thereby, means for moving the shutter leaves to make an exposure including a master member movable in two directions, a spring for moving the master member in one direction, a lever for setting the master member and tensioning the spring, a trigger for holding the master member in a set position, a leaf operating lug, a pivoted latch carried by the master member and positioned to engage and oscillate said lug when said master member is moved in one direction, a supplementary leaf operating device including an operable member outside of the shutter casing, and means inside the shutter casing operable thereby for disconnecting said latch by moving the latch on its pivot and moving said lug.

3. In a photographic shutter, the combination with a shutter casing, of shutter leaves carried thereby, means for moving the shutter leaves to make an exposure including an oscillatable master member, a spring for moving the master member, a lever for setting the master member and tensioning the spring, a trigger for holding the master member in a set position, a leaf operating lug, a pivoted latch carried by the master member and adapted to engage and oscillate said lug when moved by the master member, a supplementary leaf operating device including an operable member outside of the shutter casing, and a lever inside the shutter casing including arms for disconnecting the lug operating latch by swinging said latch upon its pivot and for manually operating the lug after said latch has been disconnected.

4. In a photographic shutter, the combination with a shutter casing, of shutter leaves carried thereby, means for moving the shutter leaves to make an exposure including a master member, a spring for moving the master member, a lever for setting the master member and tensioning the spring, a trigger for holding the master member in a set position, a leaf operating lug, a latch carried by the master member and adapted to engage and oscillate said lug, a supplementary leaf operating device including an operable member outside of the shutter casing, and a lever inside the shutter casing positioned to be moved by the operable member outside of the shutter casing, arms carried by the lever for disconnecting the lug opening latch and for manually operating the lug after said latch has been disconnected, and an arm on the setting lever normally preventing operation of said lever inside of the shutter, said arm being movable from the above mentioned position to permit operation of the lever only when said shutter is tensioned.

5. In a photographic shutter, the combination with a shutter casing, of shutter leaves carried thereby, means for moving the shutter leaves to make an exposure including an oscillatable master member, a spring for moving the master member, a lever for setting the master member and tensioning the spring, a trigger for holding the master member in a set position, a leaf operating lug, a spring latch pivotally carried on the master member and pressed by said spring into engagement with said lug to oscillate said lug, a supplementary leaf operating device including an operable member outside of the shutter casing, and means inside the shutter casing operable thereby for disconnecting said latch by swinging said latch on its pivot against the pressure of its spring and moving said lug, and a spring for normally holding said means inside of the shutter in an inoperative position whereby said shutter may be operated by the trigger.

6. In a photographic shutter, the combination with a shutter casing, of shutter leaves carried thereby, means for moving the shutter leaves to make an exposure including an oscillatable master member, a spring for moving the master member, a lever for setting the master member and tensioning the spring, a trigger for holding the master member in a set position, a leaf operating lug, a pivoted latch carried by the master member and spring pressed to engage and oscillate said lug, a supplementary leaf operating device including a push button extending through the shutter casing, and means movably mounted inside the shutter casing and engaged by the push button for disconnecting said latch by swinging it about its pivot and against the pressure of its spring, thereby unlatching said lug, said means also being positioned to engage and operate the blade lug.

7. In a photographic shutter, the combination with a shutter casing, of shutter leaves carried thereby, means for moving the shutter leaves to make an exposure including a master member, a spring for moving the master member, a lever for setting the master member and tensioning the spring, a trigger for holding the master member in a set position, a leaf operating lug, a latch carried by the master member and adapted to engage and oscillate said lug, a supplementary leaf operating device including a push button extending through the shutter casing, and means movably mounted inside the shutter casing and engaged by the push button for both unlatching and operating the blade lug, and parts of said means and said shutter setting lever positioned to engage for controlling the operation of said means by the shutter setting lever, when the shutter setting lever is in a predetermined position, said parts being moved from engagement when said setting lever is moved to another predetermined position.

8. In a photographic shutter, the combination with a shutter casing, of shutter leaves carried thereby, means for moving the shutter leaves to make an exposure including a master member, a spring for moving the master member, a lever for setting the master member and tensioning the spring, a trigger for holding the master member in a set position, a leaf operating lug, a latch carried by the master member and adapted to engage and oscillate said lug, a supplementary leaf operating device including a push button extending through the shutter casing, and means movably mounted inside the shutter casing and engaged by the push button for both unlatching and operating the blade lug, and connections between said means and said shutter setting lever for blocking the movement of said movable means unless the shutter setting lever is moved to a shutter tensioning position.

DONALD H. STEWART.